United States Patent [19]
Tani

[11] Patent Number: 6,046,780
[45] Date of Patent: Apr. 4, 2000

[54] BROADCASTING FACILITY MANAGEMENT SYSTEM AND METHOD

[75] Inventor: Yusuke Tani, Kanagawa, Japan

[73] Assignee: Sony Corporation, Tokyo, Japan

[21] Appl. No.: 08/627,087

[22] Filed: Apr. 3, 1996

[30] Foreign Application Priority Data

Apr. 7, 1995 [JP] Japan ................................. 7-108204

[51] Int. Cl.[7] .............................................. H04N 5/222
[52] U.S. Cl. ............................. 348/722; 348/6; 348/12; 386/46
[58] Field of Search .................. 348/6, 7, 9, 10, 348/17, 722, 12; 386/52, 4, 55, 83, 46–64; 364/900; 395/157, 154; 345/328; 360/69

[56] References Cited

U.S. PATENT DOCUMENTS

| | | | |
|---|---|---|---|
| 4,787,063 | 11/1988 | Muguet .................................. | 364/900 |
| 4,943,866 | 7/1990 | Barker et al. .............................. | 386/52 |
| 5,012,334 | 4/1991 | Etra ......................................... | 386/52 |
| 5,115,310 | 5/1992 | Takano et al. ........................... | 348/722 |
| 5,200,825 | 4/1993 | Perine ..................................... | 358/181 |
| 5,283,639 | 2/1994 | Esch et al. ................................ | 348/6 |
| 5,418,622 | 5/1995 | Takeuchi ................................... | 348/9 |
| 5,485,219 | 1/1996 | Woo ......................................... | 348/722 |
| 5,488,433 | 1/1996 | Washino et al. .......................... | 348/722 |
| 5,553,221 | 9/1996 | Reimer et al. ............................ | 395/154 |
| 5,557,724 | 9/1996 | Sampat et al. ........................... | 395/157 |
| 5,568,275 | 10/1996 | Norton et al. .............................. | 386/52 |

*Primary Examiner*—Tommy P. Chin
*Assistant Examiner*—Luanne P. Din
*Attorney, Agent, or Firm*—Frommer Lawrence & Haug, LLP; William S. Frommer

[57] ABSTRACT

The software of the system has a hierarchical structure. In the highest hierarchical level, a GUI 103, an automation and traffic control 104 that can be designated by the user are disposed. In the next hierarchical level, an application software program 102 is disposed through an I/F or a network. The software program 102 is connected to an MTP 105a and an SMS 105b through a network or a common memory 101c. The software program 102 conceptually substitutes a device into a stream. Thus, the devices are indirectly controlled. Up to this hierarchical level, a real-time characteristic is not required. In the lower hierarchical level than a root IDC 105c, an IDC 111, an I/O 112, and various devices 113 are connected through a network 109. In this hierarchical level, attributes of the devices are considered and the real-time characteristic is assured.

5 Claims, 7 Drawing Sheets

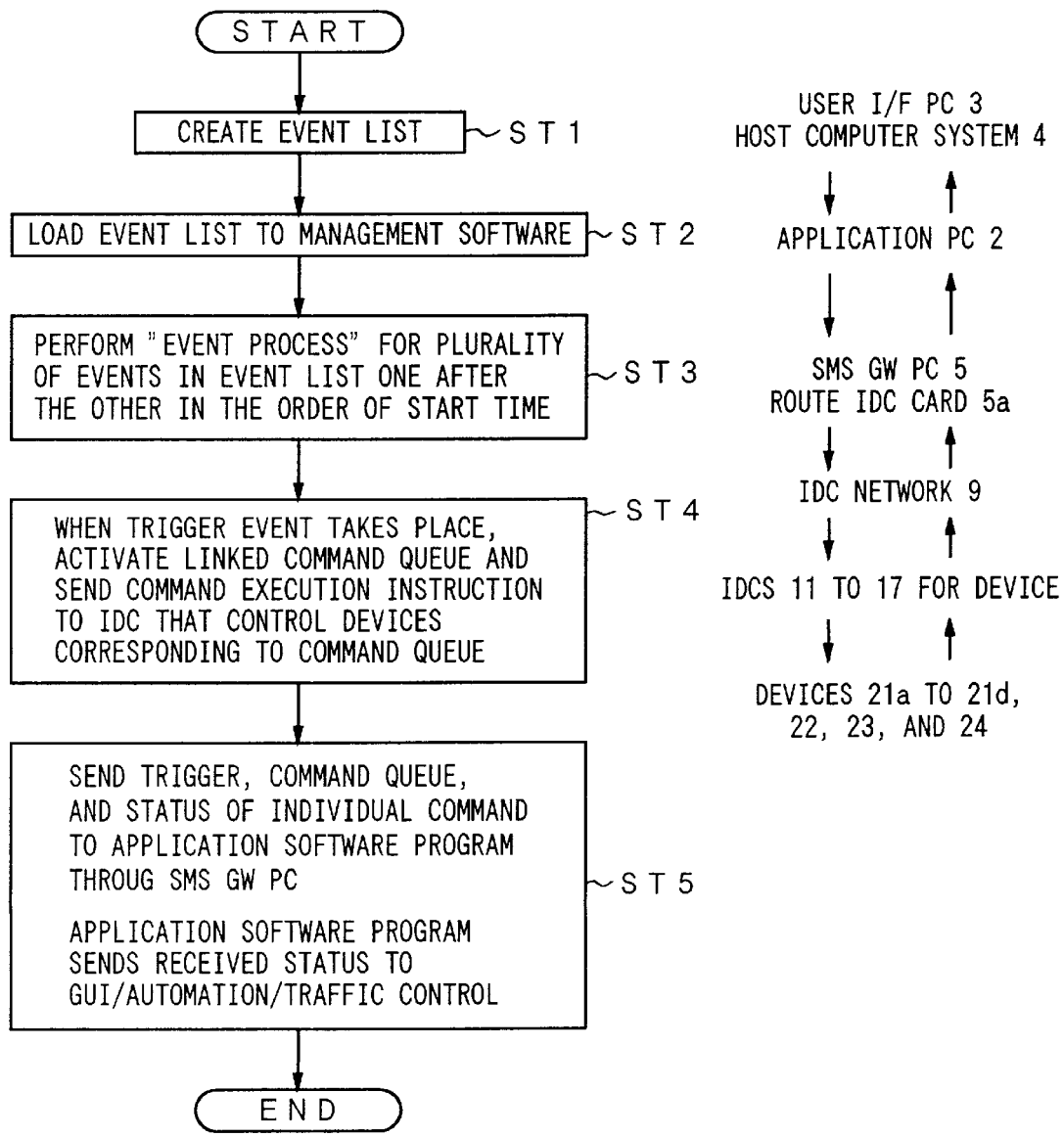

Fig. 7

- ST11 — OPEN OUTPUT CHANNEL "CHANNELOUT_1"

- ST12 — OPEN QUEUE TO WHICH COMMANDS ARE PLACED

- ST13 — OPEN FILE "SE001001" IN NORMAL PLAYBACK MODE WITH PLAYER_3

- ST14 — ISSUE CUE-UP COMMAND FOR SID=36
- ST15 — EXECUTE CUE-UP COMMAND

- ST16 — SET PLAY OMMAND FOR SID=36 TO COMMAND QUEUE (QID=35)

- ST17 — SET CMB COMMAND FOR CONNECTING SID=36 AND SID=32 TO COMMAND QUEUE (QID=35)

- ST18 — LINK COMMAND QUEUE (QID=35) AND EXTERNAL PULSE INPUT TRIGGER (ETID=GPIN_1:0)

Fig. 8
COMMAND QUEUE (QID=35)
```
PLAY    SN=21012 SID=36 DUR=00:00:10:00
        QID=35 OFST=00:00:00:00
----------------------------------------
CMB     SN=21011 SRC_SID=32 QID=35
        OFST=00:00:03:00
----------------------------------------
```
Fig. 9A
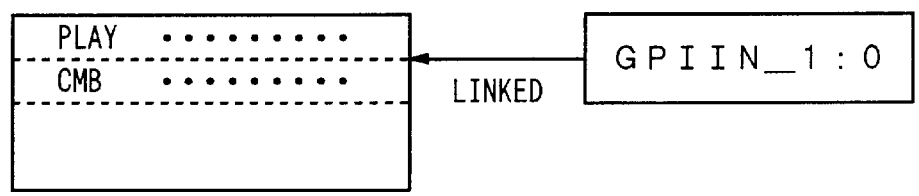
Fig. 9B
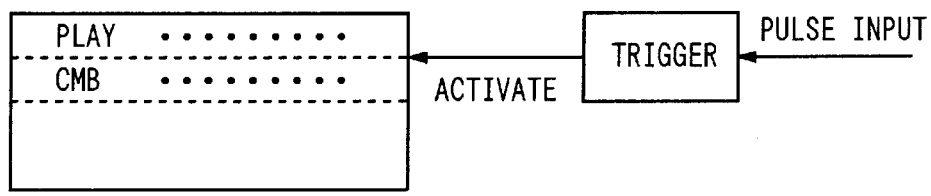

BROADCASTING FACILITY MANAGEMENT SYSTEM AND METHOD

BACKGROUND OF THE INVENTION

1. Field of the Invention

The present invention relates to a broadcasting facility management system for managing a plurality of devices disposed in a broadcasting station and a method thereof.

2. Description of the Related Art

A conventional broadcasting station is equipped with an A/V server that records, edits, and sends picture/audio signals. The A/V server is composed of a combination of conventional devices (such as a VCR, a switcher, and an editor) and a disc recorder (that records and reproduces a plurality of picture/audio signals at the same time). The combination of the devices are selected by the user. By managing the A/V server, news, commercials, and programs are recorded, edited, and sent. Conventionally, news, commercials, and programs are recorded, edited, and sent by individual systems such as "news recording system" and "commercial sending system".

Individual systems require dedicated application software programs. In other words, an application software program for one system does not have generality, expansibility, and connectivity. In reality, a conventional application software program is used only for a VCR as a picture/audio recording and sending device. Thus, unless the user completely understands the characteristics of the VCR, he or she cannot create an application software program. In addition, when another type VCR or a disc recorder is used instead of the above-described VCR, the exiting application software program should be modified corresponding to the new device. Thus, the efficiency is very low.

In recent years, the requirements from the users are becoming wide. A requirement for totally managing the broadcasting station using a server & client system based on an A/V server is becoming strong. Under the conventional architecture, to create an application software program that satisfies the requirement, a large number of program steps are required. In addition, since the software scale becomes large, the reliability thereof may deteriorate.

When a distributing process is used, a plurality of hierarchical levels such as a network and a memory may be disposed between the application software program and the device controlling portion. It is difficult for the application program to control the device on real time basis. In the conventional system, devices that can be controlled on real time basis is considered beforehand. These devices are triggered by hardware. Thus, these devices are controlled on real time basis without an intervention of the application software program. For example, the operation of the user is sent through a parallel I/O so as to start the operation of a VCR.

A plurality of devices should be controlled on real time basis. For example, while a news is being broadcast, it may be switched to a sports relay broadcast. When devices are controlled on real time basis by the conventional hardware without an intervention of an application software program, such a requirement cannot be satisfied. In other words, a device that is controlled on real time basis should be dynamically triggered.

OBJECT AND SUMMARY OF THE INVENTION

Therefore, an object of the present invention is to provide a broadcasting facility management system that flexibly accomplishes a recording system, an editing system, or a sending system for news, commercials, and programs with the same architecture and a method thereof.

Another object of the present invention is to provide a broadcasting facility management system that can dynamically trigger devices included in an A/V server and a method thereof.

A first aspect of the present invention is a broadcasting facility system having a recording/reproducing device group and a controlling device, the recording/reproducing device group being composed of a plurality of recording/reproducing devices for recording and reproducing picture/audio signals, the controlling device being adapted for controlling the recording/reproducing device group, the picture/audio signals being sent from the recording/reproducing device group and then broadcast, comprising a first controlling means for controlling the entire system and interfacing with a user, a second controlling means for controlling a time stream of events including news, commercials, dramas, and so forth and having a plurality of application software programs for monitoring the statuses of the events, a third controlling means for controlling assignment of devices included in the recording/reproducing device group corresponding to the application programs, and a fourth controlling means for controlling devices included in the recording/reproducing device group on real time basis, wherein the first controlling means and the second controlling means are connected by a network or an interface, the second controlling means and the third controlling means being connected by the network or the interface, the third controlling means and the fourth controlling means being connected by the network or the interface.

A second aspect of the present invention is a method for managing a broadcasting facility system having a recording/reproducing device group and a controlling device, the recording/reproducing device group being composed of a plurality of recording/reproducing devices for recording and reproducing picture/audio signals, the controlling device being adapted for controlling the recording/reproducing device group, the picture/audio signals being sent from the recording/reproducing device group and then broadcast, comprising the steps of creating an event list, loading the event list to a management software program, processing a plurality of events in the event list in succession and preparing the start of the events, sending a command execution instruction to a controller of devices included in the recording/reproducing device group when a designated trigger is generated, and sending the status of the command to the management software.

A portion that controls the assignment of a device in the A/V server is separated from a portion that actually controls the A/V server. The portion that controls the assignment of a device in the A/V server absorbs the physical variations. Thus, the influence against a program part that composes the application software program can be reduced. Consequently, the application software program can be shared by a plurality of devices.

Since the portion for controlling the assignment of a device in the A/V server is separated from the portion for controlling devices on real time basis, the devices can be controlled on real time basis. In addition, a plurality of commands that are executed at the same time are grouped. By linking such a command group with a trigger, a plurality of commands can be executed at the same time.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 6 is a flow chart showing an operation according to the embodiment of the present invention;

FIG. 7 is a flow chart showing a typical operation according to the embodiment of the present invention;

FIG. 8 is a schematic diagram for explaining a command queue according to the embodiment of the present invention;

FIGS. 9A and 9B are schematic diagrams for explaining the operation according to the embodiment of the present invention.

DETAILED DESCRIPTION OF THE PREFERRED EMBODIMENT

Figure 1:
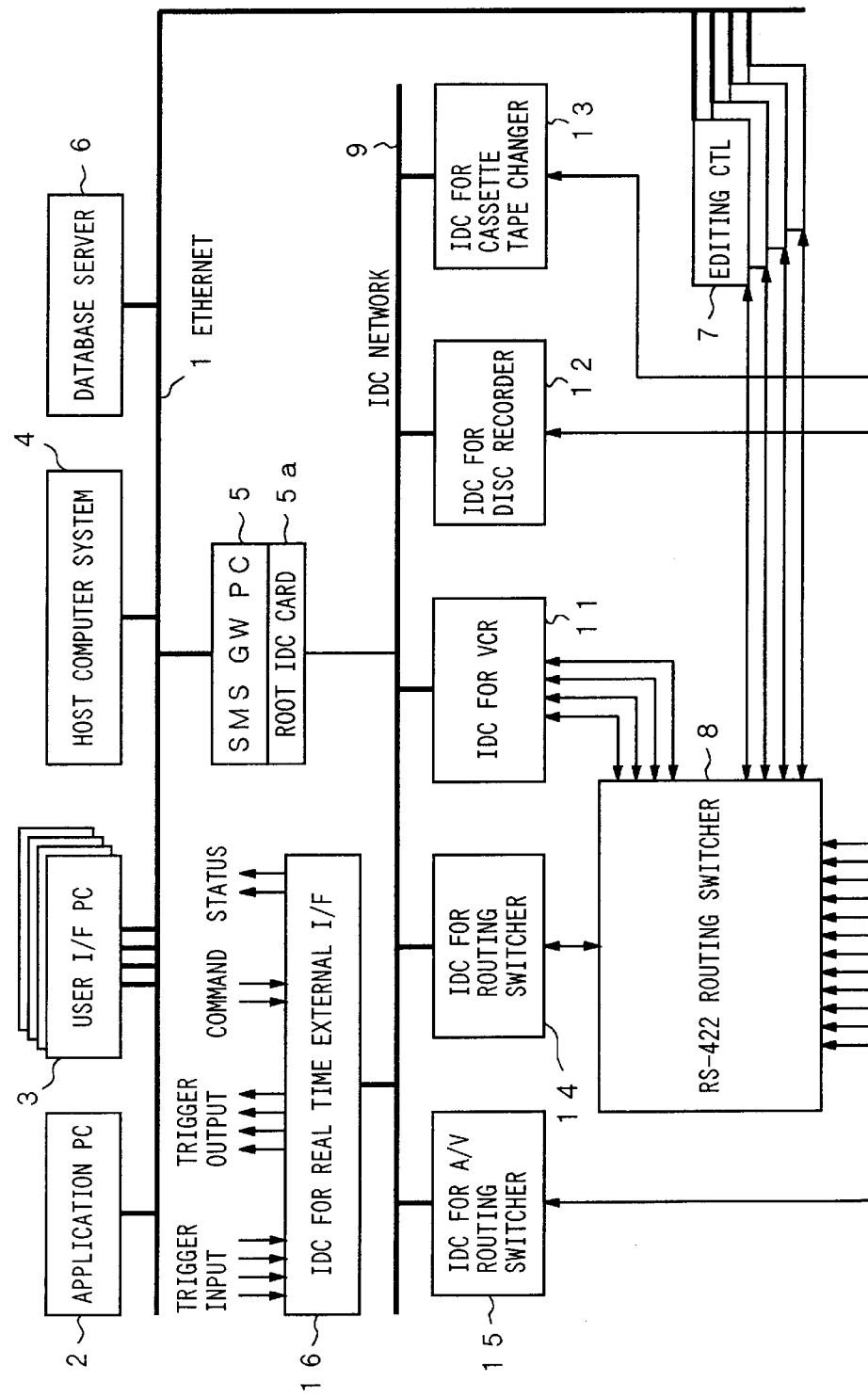
FIG. 1 is a block diagram showing a first portion of a structure of hardware according to an embodiment of the present invention.
Figure 2:
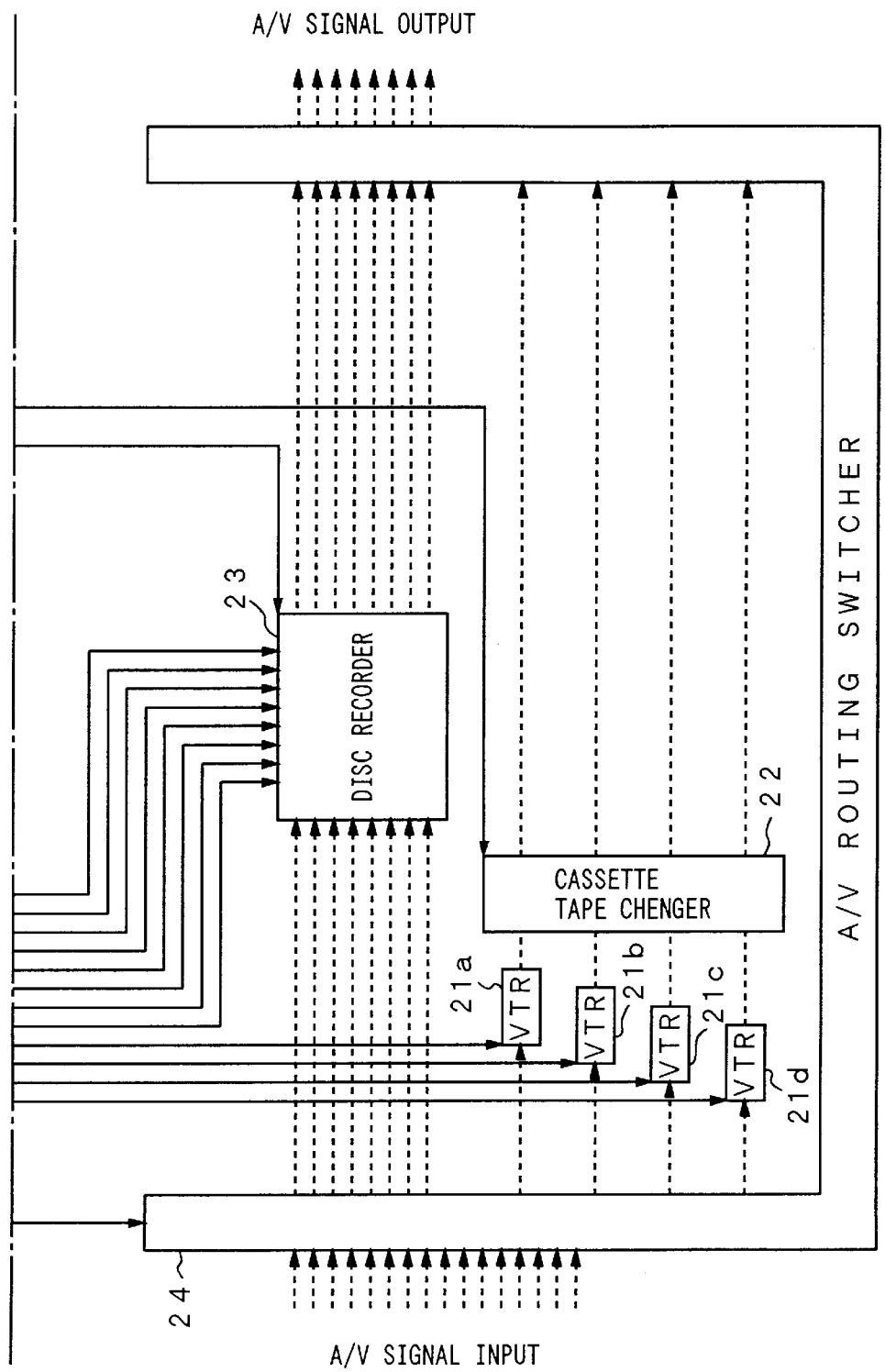
FIG. 2 is a block diagram showing a second portion of the structure of the hardware according to the embodiment of the present invention.
Figure 3:
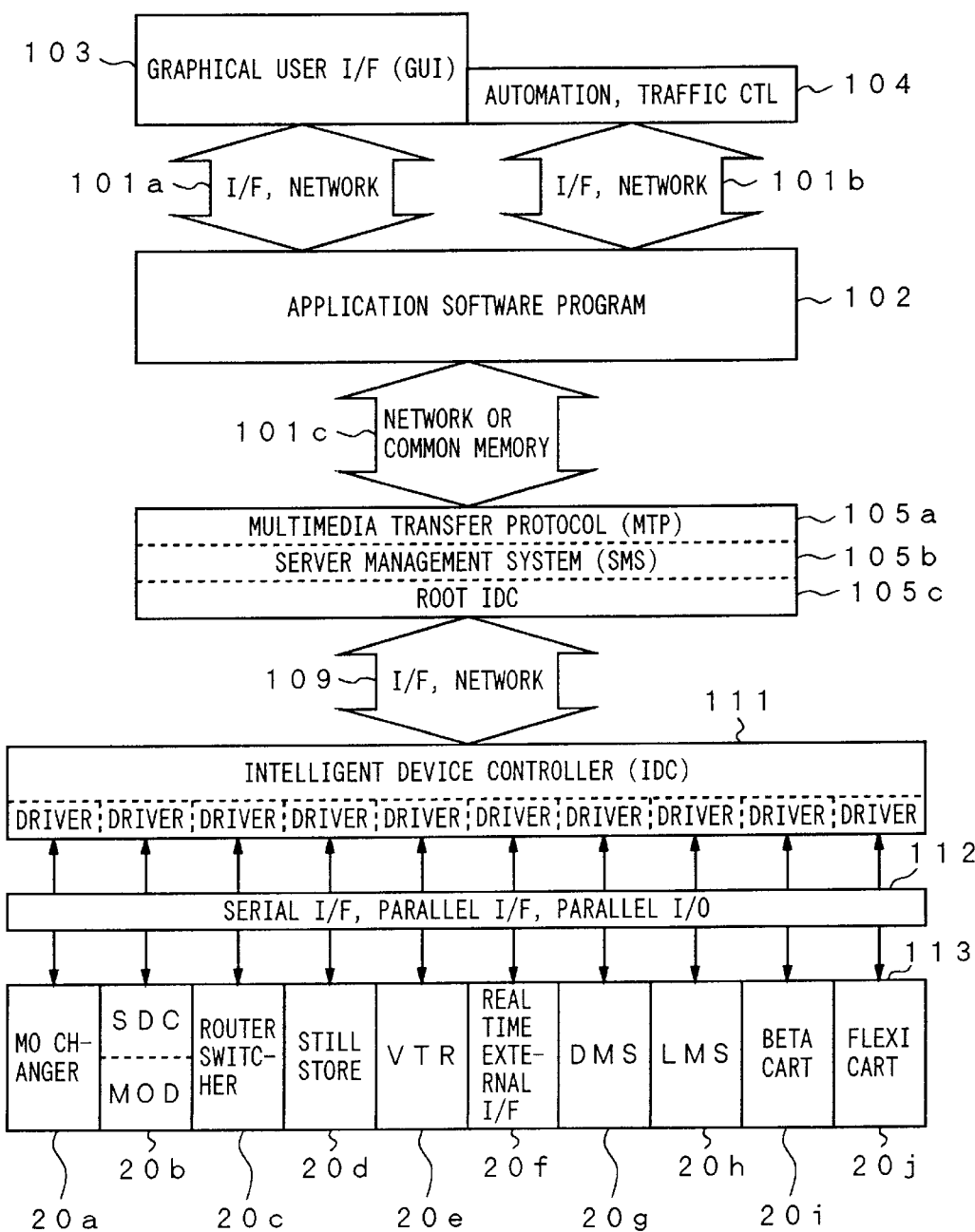
FIG. 3 is a schematic diagram showing a structure of software according to the embodiment of the present invention.

Next, with reference to the accompanying drawings, an embodiment of the present invention will be described. FIGS. 1 and 2 show an example of the structure of hardware according to the embodiment of the present invention. FIG. 1 shows a first half of the hardware, whereas FIG. 2 shows a second half of the hardware. FIG. 3 shows a hierarchical structure of software according to the embodiment. Although the following description does not mention a real system, the present invention can be widely applied for a management system of a broadcasting station. In other words, the present invention can be applied for a system related to news, a system related to commercials, a system related to programs, a system related to the entire broadcasting station, a video-on-demand system, and so forth.

Real examples of the system related to news are:
 a receiving system for receiving a source news material from the outside to the broadcasting station,
 a receiving system for receiving a source news material recorded on a tape or the like to the broadcasting station,
 an editing system for editing a recorded source news material and creating a final news material,
 a storing system for storing a source news material and a final news material, and
 a sending system for sending a final news material.

Real examples of the system related to commercials are:
 a receiving system for receiving a source commercial material from the outside to the broadcasting station,
 a receiving system for receiving a source commercial material recorded on a tape or the like to the broadcasting station,
 an editing system for editing a source commercial material and creating a final commercial material,
 a storing system for storing a source commercial material and a final commercial program, and
 a sending system for sending a final commercial program.

Real examples of the system related to programs are:
 a receiving system for receiving a source program material from the outside to the broadcasting station,
 a receiving system for receiving a source program material recorded on a tape or the like to the broadcasting station,
 an editing system for editing a source program material and creating a final program material,
 a storing system for storing a source program material and a final program material, and
 a sending system for sending a final program material.

Real examples of the system related to the entire broadcasting station are:
 a controlling system for organizationally connecting individual systems related to news, commercials, and programs and centrally controlling the management of the entire broadcasting station, and
 a recording system for successively recording all programs broadcast from the broadcasting station.

Next, with reference to the accompanying drawings, a broadcasting facility management system according to the embodiment of the present invention will be described. FIGS. 1 and 2 are block diagrams showing the structure of the broadcasting facility management system. Referring to FIG. 1, an application PC (personal computer) 2, a user interface PC 3, a host computer system 4 (that has been disposed in the broadcasting station and is referred to as a station automation or a traffic management system), an SMS (server management system) GW (gate way) PC 5, a database server 6, and an editing controller 7 are connected through a network (for example, Ethernet) 1. Commands, status, and data are exchanged through the network 1. It should be noted that Ethernet is an example of the network 1. Thus, another computer network that is equivalent or higher than Ethernet can be used.

Normally, a plurality of user interfaces PC 3 are disposed. Each user interface PC 3 receives data from a keyboard or a mouse operated by a user of the broadcasting station. In addition, the user interface PC 3 displays the status of a management application software program executed on the application PC 2 on a CRT screen. The management application software program composes systems related to news, commercials, programs, and entire broadcasting station. Normally, a plurality of application software programs are loaded to the application PC 2.

A user may designate a platform for hardware (IBM PC compatible, UNIX WS, etc.), operating system, and window system (MS-Windows, Windows NT, Mac OS, X-Windows, etc.) so that Look & Feel compatibility can be accomplished between the system disposed in the broadcasting station and the broadcasting facility management system. Thus, according to the present invention, an architecture of which the user interface is separated from the management application software program is used so that the broadcasting facility management system flexibly handles a variety of platforms.

In a broadcasting station, a variety of operations are performed. However, as estimated with the real example of the above-described system, the operations can be simplified to two elements that are "sending operation" (for sending picture/audio signals from a particular location to another location) and "recording operation" (for recording picture/audio signals from a particular location to another location). Routes of picture/audio signals are combined with the two elements. The results are placed on the time base.

A list of basic information to be sent or recorded (such as execution start time, send/record time, input/output channels, material file names, and so forth) is created. This list is generally referred to as an event list. The event list is categorized as a send event list and a record event list. The management program is executed so as to send/record picture/audio signals corresponding to the event list.

The event list is created by a user interface program in the user interface PC 3 or by the host computer system 4, which has been disposed in the broadcasting station and is referred to as a station automation or a traffic management. The event list is sent to the management program in the application PC 2. The event list has a predetermined format. The application PC 2 does not depend on a particular platform. However, from a viewpoint of system installation, the application PC 2 can operate with one platform regardless of requests of various broadcasting stations.

The host computer system 4 totally manages the operations in the broadcasting station. In the conventional broadcasting system, the host computer system 4 should control individual management applications for news, commercials, and programs. On the other hand, the system with the architecture according to the present invention can unify control procedures of the host computer system 4.

The editing controller 7 is an editing device that edits a news material. Conventionally, the editing controller 7 directly controls a VCR. On the other hand, in the system according to the present invention, a command for opening a required material file and a command for connecting the system to the material are requested to the SMS GW PC 5 through the network 1. Thus, the SMS GW PC 5 operates an RS-422 routing switcher 8. The routing switcher 8 connects the editing controller 7 and the opened material file. Thereafter, as with the conventional editing operation for directly controlling the conventional VCR, an editing operation can be performed by the editing controller 7.

As in the editing operation performed by the editing controller 7, according to the present invention, devices are conceptually substituted into streams. As with the operation for accessing a file, a relevant stream is opened. The access right of the opened stream is obtained. By issuing a command to the opened stream, the device is controlled.

The RS-422 routing switcher 8 has an RS-422 I/F and an RS-422 switching function. The routing switcher 8 switches a connection corresponding to a command received from an IDC 14. In this example, the routing switcher 8 selectively connects one of a path from an IDC 11 for VCR and a path from the editing controller 7 to VCRs 21a to 21d and a disc recorder 23.

The SMS GW PC 5 causes a plurality of application software programs to exclusively control many resources such as a plurality of VCRs, a plurality of A/V servers, a plurality of input/output channels. In addition, the SMS GW PC 5 sends a command to each IDC (intelligence device controller) that controls a relevant resource on real time basis through a root IDC card 5a. Moreover, the SMS GW PC 5 stores recorded material file information and has connection information for devices.

The application PC 2 has a basic command group MTP (multimedia transfer protocol) for sending such information to the application software program and for operating the application software program. With the MTP, the user does not feel the platform of the SMS GW. However, in a real example, since the root IDC card 5a requires an EISA bus, as a hardware platform, an IBM PC compatible machine is specifically used. The hardware and software in the lower level than the SMS GW PC 5 is referred to as "A/V server".

The MTP is a command group for allowing the application software program to flexibly deal with an expansion of the hardware of the A/V server. In addition, the MTP is a protocol composed of a command group for allowing picture/audio signals in the A/V server to be easily and effectively operated on real time basis. The application software program indirectly controls the picture/audio signals in the A/V server and paths thereof with the command group corresponding to the MTP. In other word, as with the file accessing operation, the MTP opens a relevant stream, sends a command to the opened stream, and controls it. Thus, the application software program can flexibly deal with an expansion of the hardware.

A root IDC card 5a is a board inserted into an EISA card slot of the SMS GW PC 5. The SMS GW PC 5 communicates with each device through the root IDC card 5a and the IDC network 9.

A device real time controller is connected to the IDC network 9. In other words, in the example shown in FIG. 1, an IDC 11 for VCR, an IDC 12 for disc recorder, an IDC 13 for cassette tape changer, an IDC 14 for RS-422 routing switcher, an IDC 15 for A/V routing switcher, and an IDC 16 for real-time external I/F are connected to the IDC network 9. Each of the IDC includes a device driver. Between each IDC and the relevant device, a network, an interface, and a serial I/O or a parallel I/O that correspond to the device are disposed. In the IDC network 9, a real time characteristic for communications is assured.

The real time external I/F connected to the IDC 16 receives a command and a trigger from an external device and sends a trigger and a status to an external device. The real time external interface has a function for sending a trigger so as to start the execution of a command in the root IDC card 5a.

FIG. 2 shows devices used in the system according to the embodiment. Reference numerals 21a, 21b, 21c, and 21d are business-use VCRs. These VCRs 21a to 21d support a predetermined format (for example, RS-422 parallel I/O protocol). These VCRs 21a to 21d are controlled corresponding to commands received from the IDC 11.

In association with the VCRs 21a to 21d, a cassette tape changer 22 is disposed. The cassette tape changer 22 is for example LMS (library management system), Flexicart, Betacart, or the like. Flexicart is a registered trademark by Sony Corporation. The cassette tape changer 22 automatically loads cassette tapes to a plurality of built-in VCRs. The cassette tape changer 22 has an RS-422 I/F. The cassette tape changer 22 is controlled corresponding to a command received from the IDC 13.

Reference numeral 23 is a disc recorder. The disc recorder 23 records and sends a plurality of channels (for example eight channels) of picture/audio signals at the same time. The disc recorder 23 is treated as a plurality of VCRs (for example, eight VCRs). Thus, the interface of the disc recorder 2 accords with the interface of the disc recorder 23. The disc recorder 23 is connected to the IDC 11 for VCR or the editing controller 7 through the routing switcher 8.

In FIG. 2, as represented by dotted lines, inputs and outputs of the A/V (audio/vidual) signals are switched by the A/V routing switcher 24. The A/V routing switcher 24 has an S-BUS I/F. The input/output channels are switched corresponding to a command received from the IDC 15.

The soft ware of t he system according to the embodiment of the present invention has a hierarchical structure as shown in FIG. 3. In the highest hierarchical level, a graphical user interface (GUI) 103 and an automation, traffic control 104 are disposed. The GUI 103 is loaded to the user I/F PC 3.

The automation, traffic control 104 is loaded to the host computer system 4.

The highest hierarchical level (of the GUI 103 and the automation, traffic control 104) and the next hierarchical level are connected with an I/F or networks 101*a* and 101*b*. An application software program 102 is connected to the GUI 103 and the automation, traffic control 104 with a relation of a server and a client, respectively. The network 1 in FIG. 1 accords with the I/F or networks 101*a* and 101*b* in FIG. 3. The application software program 102 is installed to the application PC 2. It is not necessary to communicate on real time basis the GUI 103 and the automation, traffic control 104 with the application software program 102 in the lower hierarchical level.

The application software program 102 and an SMS 105*b* are connected through a network or a common memory (that accords with the network 1 in FIG. 1). The application software program 102 performs a communication corresponding to an SMS 105*b* and an MTP 105*a*. A root IDC 105*c* (that accords with the root IDC card 5*a* in FIG. 1) relevant to the SMS 105*b* is connected to an IDC and driver group 111 in the lower hierarchical level through an I/F or a network (that accords with the IDC network 9 in FIG. 1). Communications from the root IDC 105*c* to a device group 113 in the lowest hierarchical level should be performed on real time basis.

The IDC and driver group 111 is connected to the device group 113 through a serial I/F, a parallel I/F, or a parallel I/O 112. In FIG. 2, the device group 113 accords with the VCRs 21*a* to 21*d*, the cassette tape changer 22, the disc recorder 23, and the A/V routing switcher 24 in FIG. 2. On the other hand, FIG. 3 shows more devices than the structure of FIG. 2. It should be noted that devices that are not shown in FIGS. 2 and 3 can be disposed in the system. These devices have basic functions for recording, editing, and sending picture/audio signals. On the other hand, the devices are conceptually substituted into streams. The application software program 102 deals with devices as files. Thus, even if devices are added or changed, the application software program 102 can flexibly handle these devices.

In FIG. 3, reference numeral 20*a* is an MO changer. The MO changer 20*a* automatically loads a desired one of many magneto-optical discs into an MO drive so as to record and reproduce data on and from the loaded disc. Reference numeral 20*b* is an MO drive and a server data controller (SDC). Reference numeral 20*c* is a router or a switcher. The router or switcher 20*c* accords with the A/V routing switcher 24 shown in FIG. 2.

Reference numeral 20*d* is a still picture storing device that stores a still picture. Reference numeral 20*e* is a business-use VCR (that accords with the VCRs 21*a* to 21*d* in FIG. 2). Reference numeral 20*f* is a real-time external interface. Reference numeral 20*g* is a DMS (a cassette cart machine for a data recorder). Reference numeral 20*h* is an LMS. Reference numeral 20*i* is a beta cart machine. Reference numeral 20*j* is a flexicart. In FIG. 2, the cassette tape changer 22 is disposed corresponding to these cart machines. In the software structure shown in FIG. 3, the software (and hardware) on the lower hierarchical level than the root IDC 105*c* is device dependent.

Figure 4:
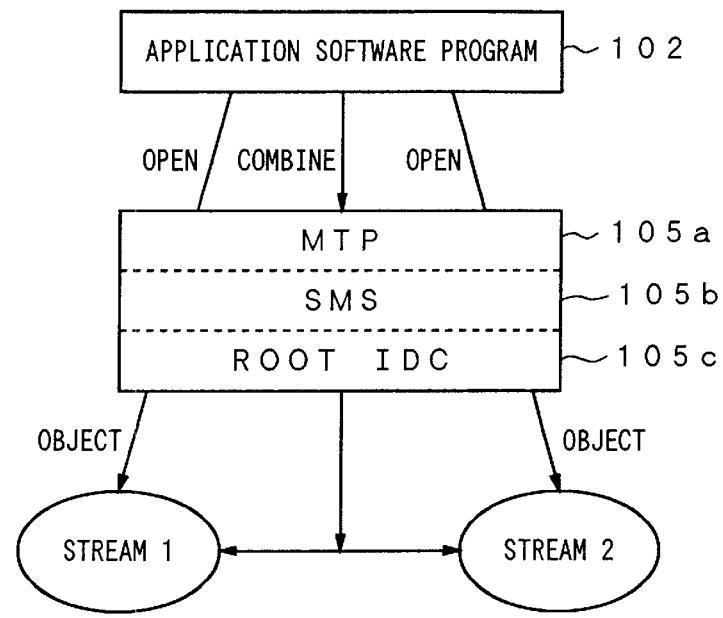
FIG. 4 is a schematic diagram showing a basic operation according to the embodiment of the present invention.

FIG. 4 schematically shows the structure of the embodiment of the present invention. When the application software program 102 sends an open command corresponding to the MTP, the MTP 105*a* and the SMS 105*b* return particular SIDs (stream IDs) corresponding to the received open command. The application software program should open all streams for reproducing, recording, sending, receiving, reading, and/or writing various files. The streams represent files, routes, encoders, decoders, input channels, output channels, controllers, and so forth.

When all the streams are opened, the MTP 105*a* and the SMS 105*b* prepare SIDs for individual resources. The application software program 102 sends a command COMBINE that connects two streams (for example, streams 1 and 2). The command COMBINE connects two objects and causes them to operate together. The command COMBINE can be also used to connect a controlling stream and a controlled stream (for example, a control panel and a VCR) in addition to routing of the A/V signal.

The MTP 105*a* and the SMS 105*b* prepare unique SIDs for opened streams. In other words, after the application software program 102 has opened a plurality of streams, the opened streams have individual SIDs. The application software program 102 can designate a stream corresponding to an SID.

Figure 5:
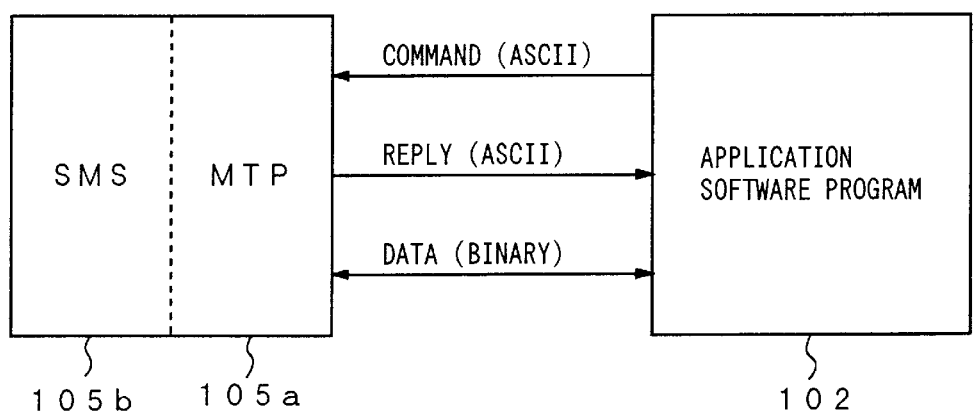
FIG. 5 is a schematic diagram showing connections for communications according to the embodiment of the present invention.

FIG. 5 shows connections for which the MTP 105*a* and the SMS 105*b* of the embodiment communicate with the application software program 102. For the transport layer of the communication, any protocol can be used. However, as described above, when Ethernet is used for physical connections and TCP/IP is used for a protocol, the communication can be effectively made.

In FIG. 5, a first connection is used to send a command. A second connection is used to send a reply corresponding to a command. A command and a reply thereof performed in the first connection are written with an ASCII code. With an ASCII code, a debugging operation and a logging operation can be easily performed. A third connection is used to send and receive data. This connection is made when a large amount of (binary) data is sent. In other words, the first and second connections are always required.

Next, a flow of the basic operation of the embodiment of the present invention will be described with reference to FIG. 6. In FIG. 6, the relation between the content of each step and the relevant hardware portion is shown. At the first step ST1, an event list is created. The user creates an even list with the user I/F PC 3 or the host computer system 4.

At the next step ST2, the application PC 2 loads the event list to the management software program. At the step ST3, events are processed one after the other in the order of the start time. The event process will be described later.

At the step ST3, when the event process is completed, the event start preparation is completed. At step ST4, when a trigger takes place, a linked command queue is activated. Thus, a command execution instruction is sent to an IDC that controls devices corresponding to the command queue. The process after the trigger event takes place until commands are sent to devices is performed on a layer of which a process is performed on real time basis. In other words, this process is performed on a layer lower than the root IDC 105*c* shown in FIG. 3. Thus, the same real-time characteristic as the conventional broadcasting system can be assured.

The trigger, the command queue, and the status of each command are sent to the application software program 102 through the SMS GW PC 5. The application software program 102 sends the received status to the GUI 103 and the automation/traffic control 103 and 104. Thus, the user or the host computer system 4 knows the execution status of the event (for example, whether or not the event is normally executed).

At step ST3 (the event process), the following operations 1) to 6) are performed.

1) A file to be sent or recorded and a required resource such as an output channel are opened.

2) A send/record start position is cued up.

3) An event operation start trigger (external pulses, time, etc.) is opened. This trigger is accomplished on a layer of which a process can be performed on real time basis.

4) A command queue for controlling the event operation start command is opened. This command queue is executed on a layer of which a process can be performed on real time basis.

5) When the event operation is started, a plurality of command groups (PLAY, RECORD, channel change, etc.) that should be synchronously executed are placed in the command queue that has been opened at 4).

6) The trigger that has been opened at 3) is linked with the command queue that has been prepared at 5).

Next, an typical example of the operation of the embodiment will be described with reference to FIG. 7. FIG. 7 shows a flow of the above-described event process (namely, the event start preparation process). In FIG. 7, the contents of commands sent from the application software program 102 to the MTP 105*a* and the SMS 105*b* are mainly shown.

At step ST11, the following command is sent so as to obtain a designated resource or a file (for example, an output channel with a resource name "CHANNELOUT__1"). "CHANNELOUT__1" is a stream.

OPEN SN=10000 MD=FIFO PATH=CHANNELOUT__1PR=1

"SN" in the command message is a parameter generated by the application software program 102. "SN" is used to designate a sequence number. With the sequence number, a command is synchronized with a reply thereof. "PATH" is a file name. "PR" is a parameter that represents reserve/cancel for a resource.

When the MTP 105*a* and the SMS 105*b* receive the command, they return the following status to the application software program 102.

RET SN=10000 WHEN=10:48:11:06 VAL=OK CID=0 SID=32 RSC=CHANNELOUT__1

In other words, the command is received at the time designated by "WHEN" as a valid command. CHANNELOUT__1 is opened with SID=32. "RSC" designates a resource name.

At step ST12, a queue in which commands are placed is opened. The following command is issued.

OPEN SN=11001 MD=CMDQ

"MD" designates a mode. As a result, the following status is returned.

RET SN=11001 WHEN=10:48:21:09 VAL=OK CID=1 QID=35

This status represents that a new command with QID=35 and CID=1 has been opened. As shown in FIG. 8, a command queue is a like a shelf in which commands distinguished with an ID signal "QID" are successively placed.

At step ST13, a file "SE001001" is opened in normal playback mode (MD=NPLAY) with PLAYER__3. The following command is issued.

OPEN SN=10011 MD=NPLAY RSC=PLAYER__3 PATH=: :SE001001 PR=1

"RSC" designates a resource name. As a result, the following status is returned.

RET SN=10011 WHEN=10:48:24:08 VAL=OK CID=2 SID=36 RSC=PLAYER__3

This status represents that "SE001001" is opened as SID=36 with PLAYER__3. "SE001001", PLAYER__3 is another stream. In more reality, a cassette with a name "SE001001" is loaded to a player (PLAYER__3).

At step ST14, the following cue-up command is issued to SID=36.

CUEUP SN=11041 SID=36 POS=SOM

As a result, the following status is returned.

RET SN=1041 WHEN=10:49:04:13 VAL=OK CID=3

At step ST15, a cue-up command is executed. Thus, a top portion of a desired program has been detected. At step ST15, the following statuses are successively returned.

CSTAT SN=0 WHEN−10:49:04:16 CID=3 STAT=EXECUTED

This status represents that the queue-up command (CID=3) has been started for SID=36.

SSTAT SN=0 WHEN=10:49:04:24 SID=36 STAT=CUEING

This status represents that the status of SID=36 becomes CUEING.

SSTAT SN=0 WHEN=10:49:09:10 SID=36 STAT=STILL

This status represents that the status of SID=36 becomes STILL.

CSTAT SN=0 WHEN=10:49:09:12 CID=3 STAT=COMPLETED

This status represents that the cue-up command (CID=3) for SID=36 has been completed.

At step ST16, the following PLAY command is set to a command queue (QID=35) for SID=36.

PLAY SN=21012 SID=36 DUR=00:00:10:00 QID=35 OFST=00:00:00:00

"DUR" designates a duration. As a result, the following status is returned.

RET SN=21012 WHEN=10:49:41:14 VAL=OK CID=4

At step ST17, a command CMB for connecting SID=36 and SID=32 is set to the command queue (QID=35). This command is used to place particular commands to the command queue. In addition, this command is used to designate routes of an A/V stream and a control stream. When an offset of 3 seconds is required, OFST=00:00:03:00 is designated.

The following command is issued.

CMB SN=21011 SRC__SID=36 DEST__SID=32 QID=35 OFST=00:00:03:00

"SRC__SID" is a source side stream ID. "DEST__SID" is a destination stream ID. As a result, the following status is returned.

RET SN=21011 WHEN=10:49:42:14 VAL=OK CID=5

At step ST18, the command queue (QID=35) and an external pulse input trigger (ETID=GPIIN__1:0) are linked. The input trigger can be linked to a single command queue. The input trigger is initially disabled. While the input trigger is being disabled, physical pulses that are input are ignored. Physical pulses are generated from a trigger device. A timer is an example of the trigger pulse.

The following linking command is issued.

CQLINK SN=31041 EQID=35 ETID=GPIIN__1:0

As a result, the following status is returned.

RET SN=3101 WHEN=10:49:51:08 VAL=OK CID=6

Thus, as shown in FIG. 9A, a trigger is linked to a designated command queue. After step ST18 is completed, the event start preparation is completed and the system waits for a trigger.

As shown in FIG. 9B, when pulses are input from a trigger device, the following statuses are successively sent from the MTP 105*a* and the SMS 105*b* to the application software program 102.

TSTAT SN=0 WHEN=10:50:41:11 TID=GPIIN__1:0 STAT=ACTIVATED

This status represents that pulses have been input at time 10:50:41:11.

CQSTAT SN=0 WHEN=10:50:41:11 QID=35 STAT= ACTIVATED, QUEUED

This status represents that a command queue (QID=35) has been activated at time 10:50:41:11.

CSTAT SN=0 WHEN=10:50:41:11 CID=5 STAT= EXECUTED

This status represents that the execution of the PLAY command (CID=5) that has been set at step ST16 is started at time 10:50:41:11.

CSTAT SN=0 WHEN=10:50:44:11 CIDE=6 STAT= EXECUTED

This status represents that the execution of the CMB command (CID=6) that has been set at step ST17 is started at time 10:50:41:11.

CSTAT SN=0 WHEN=10:50:44:11 CID=6 STAT= COMPLETED

This status represents that the execution of the CMB command (CID=6) has been completed.

CSTAT SN=0 WHEN=10:50:51:11 CID=5 STAT= COMPLETED

This status represents that the execution of the PLAY command (CID=5) has been completed.

The last opened streams (SID and QID are closed. Thus, the following commands are issued.

CLOS SN=41002 SID=32

CLOS SN=41001 SID=36

CLOS SN=41003 SID=35

While the application software program 102 is executing a particular event, a plurality of MTP commands may be executed at the same time. On the other hand, when the MTP command is preset for issuing a trigger in future, it takes a time. Before all MTP commands necessary for executing an event are set, if a trigger is input, the execution of the event is adversely affected.

As described above, according to the embodiment of the present invention, when a plurality of MTP commands should be executed at the same time, these commands are placed in the same command queue. Thereafter, the command queue is linked to a trigger. When the command queue is enabled, the trigger can be input while the command queue is in an active state. On the other hand, when the command queue is disabled, it can be edited. When it is necessary to execute a command with an offset time after a trigger is input, the trigger can be linked to the command with the offset time. Thus, according to the present invention, a plurality of MTPs can be executed at the same time. An event can be executed without a difficulty.

According to the present invention, any of a recording system, an editing system, and a broadcasting system for news, commercials, and programs can be accomplished by hardware and software with the same architecture. Thus, the present invention has the following advantages.

Devices with new functions can be added. The total amount of data of a source material to be recorded and sent can be increased. The number of input/output channels can be increased. The system can be expanded corresponding to the increase of the number of users. New signal formats can be used. Thus, since the change of the hardware that cannot be estimated in the design stage of the system is absorbed by the MTP and the SMS GW, it is not necessary to change the application software program.

In comparison with the method of which individual systems for news, commercials, and programs are designed with individual architectures and protocols, since the architecture of the management application software program is unified, the number of design steps for the hardware and software can be remarkably reduced.

Since the existing devices that have been disposed in the broadcasting station can be used in the system according to the present invention, the existing resources can be effectively used.

Since the portion that is changed corresponding to requests from users (namely, the user interface, the station automation, and the traffic management) is clearly separated from the portion that is commonly used by many users (namely, the portions in the level lower than the application software program), a system with high reliability can be structured.

In addition, according to the present invention, since the real-time oriented portion is separated from the non-real-time oriented portion, command are sent to devices on real time basis so as to control the devices.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A broadcasting facility system having a recording/reproducing device group and a controlling device, the recording/reproducing device group being comprised of a plurality of recording/reproducing devices for recording and reproducing picture/audio signals, the controlling device being adapted for controlling the recording/reproducing device group, the picture/audio signals being sent from the recording/reproducing device group and then broadcast, comprising:

first controlling means for controlling the recording/reproducing devices and the controlling device and for providing a graphical user interface to a user;

second controlling means connected to said first controlling means by a first interface for controlling a plurality of events, said second controlling means having a plurality of application software programs for monitoring a status of each of the events;

third controlling means connected to said second controlling means by a second interface for assigning the recording/reproducing devices to respective application software programs by receiving a command from said second controlling means, assigning an ID with respect to said recording/reproducing devices being instructed by the received command and transmitting said ID to said second controlling means; and fourth controlling means connected to said third controlling means by a third interface for controlling the recording/reproducing devices on real time basis, wherein said controlling device controls the recording/reproducing devices using said first, second, third and fourth controlling means such that the events are edited in response to said user.

2. The broadcasting facility system as set forth in claim 1, wherein said first controlling means, said second controlling means, said third controlling means, and said fourth controlling means are hierarchically structured.

3. The broadcasting facility system as set forth in claim 2, wherein the devices included in the recording/reproducing device group are a VCR, a disc recorder, and a routing switcher.

4. The broadcasting facility system as set forth in claim 3, wherein said first controlling means includes a personal computer that interfaces a host computer with the user, the personal computer being adapted for inputting commands issued by the user, and the application software programs being adapted for displaying the status of events being executed.

5. The broadcasting facility system as set forth in claim 1, wherein said second controlling means is adapted for sending a command to said third controlling means, said third controlling means being adapted for sending a status of execution state of the command to said second controlling means, for linking a plurality of commands executed at the same time with a predetermined trigger, and for executing the commands when the predetermined trigger is input.

* * * * *